No. 876,406. PATENTED JAN. 14, 1908.
J. C. SIMONSON.
MOTOR VEHICLE.
APPLICATION FILED MAR. 13, 1907.
2 SHEETS—SHEET 1.
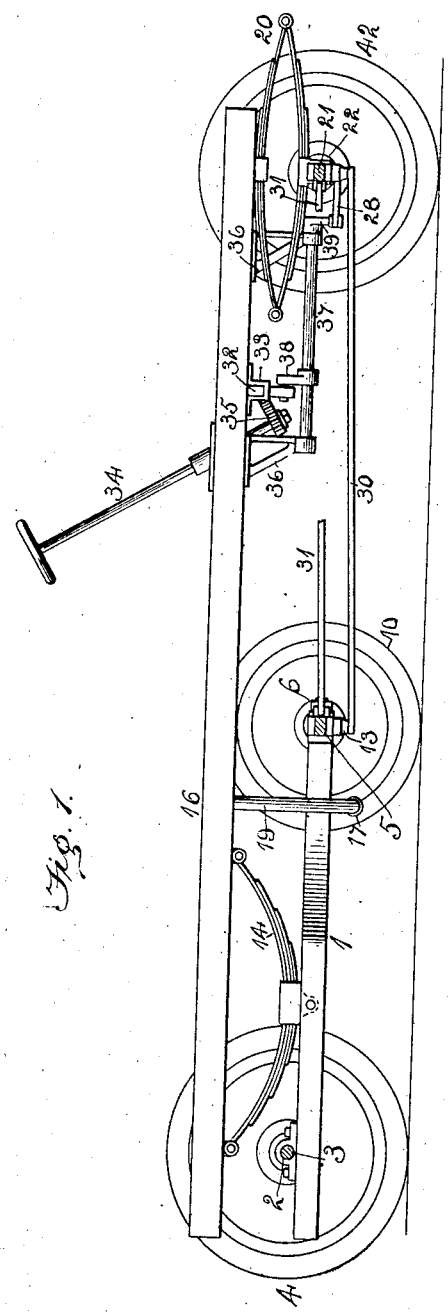
Witnesses
C. B. Clark
E. Behel
Inventor
James C. Simonson
By A. O. Behel
Attorney No. 876,406.
J. C. SIMONSON.
MOTOR VEHICLE.
APPLICATION FILED MAR. 13, 1907.
PATENTED JAN. 14, 1908.
2 SHEETS—SHEET 2.
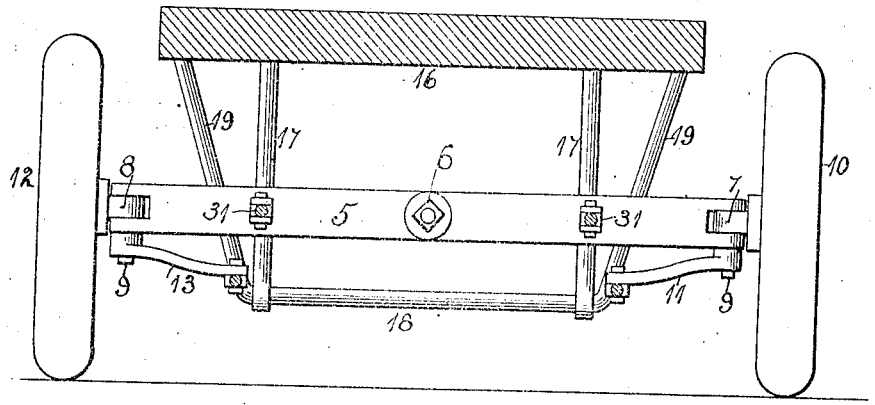
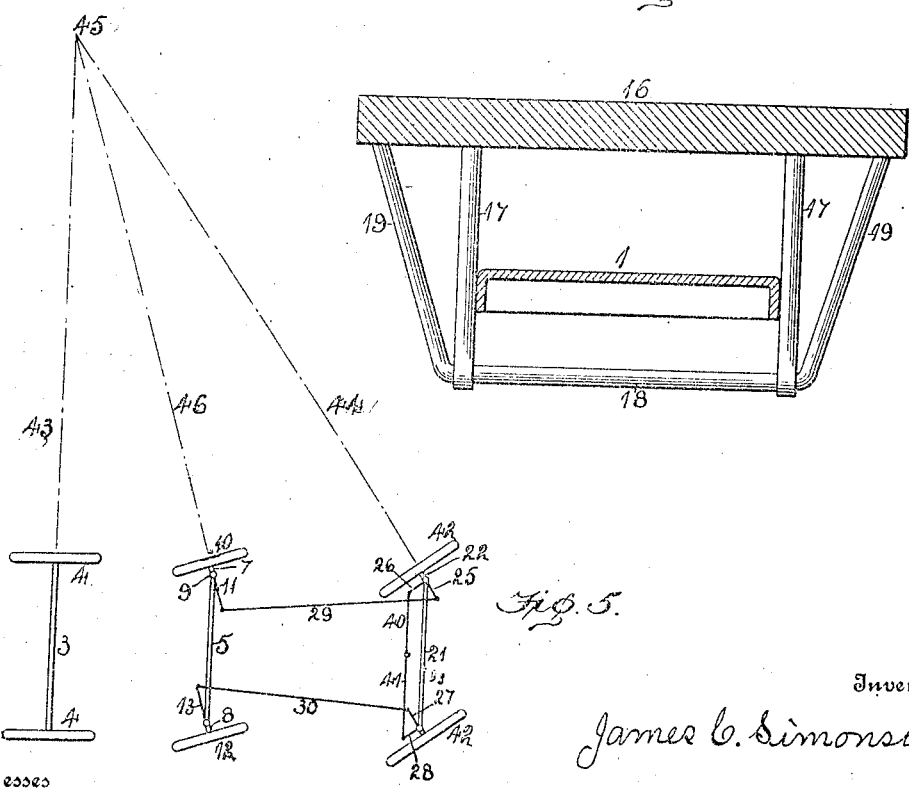

UNITED STATES PATENT OFFICE.

JAMES C. SIMONSON, OF ROCKFORD, ILLINOIS.

MOTOR-VEHICLE.

No. 876,406.   Specification of Letters Patent.   Patented Jan. 14, 1908.

Application filed March 13, 1907. Serial No. 362,213.

*To all whom it may concern:*

Be it known that I, JAMES C. SIMONSON, a citizen of the United States, residing at Rockford, in the county of Winnebago and State of Illinois, have invented certain new and useful Improvements in Motor-Vehicles, of which the following is a specification.

The object of this invention is to lessen the shock or jar imparted to the rear portion of a motor vehicle. This I accomplish by the employment of a truck connected about midway of its length to the rear portion of the motor vehicle, and employing carrying wheels for each end of the truck.

The further object of this invention is to distribute the weight or load on six supporting wheels instead of four as heretofore employed.

The further object of this invention is to construct a six wheeled motor vehicle, four of the wheels controlled by the steering apparatus, and four of the wheels supporting a truck which supports the rear portion of the vehicle.

In the accompanying drawings. Figure 1 is a vertical lengthwise section on dotted line *a a* Fig. 2. Fig. 2 is an underface view. Fig. 3 is a transverse vertical section on dotted lines *b b* Fig. 2. Fig. 4 is a transverse vertical section on dotted line *c c* Fig. 2. Fig. 5 is a diagram illustrating the manner of connecting the steering wheels.

In the drawings I have shown my improvements in connection with the platform of a motor vehicle, the body and motor parts not being shown, as my improvements relate to the supporting of the platform and steering arrangements.

A truck 1 has two boxes 2, in this instance, secured to its upper face. A rear axle 3 is supported by the boxes in a manner to rotate therein. Two supporting wheels 4 are suitably connected with the axle to be rotated thereby. Any suitable connection can be made between the axle and the motive power of the vehicle. To the front end of the truck is pivotally connected a central axle 5 midway of its length on the pivot 6. To opposite ends of this axle are pivotally mounted the supports 7 and 8 in a manner to permit them to turn on a vertical pivot 9. To the support 7 is connected a supporting wheel 10, and an arm 11 extends inward from the support. To the support 8 is connected a supporting wheel 12, and an arm 13 extends inward from the support. To the upper face of the truck are pivoted two springs 14, their free ends are connected to the underface of the vehicle platform 16. From the underface of the platform 16 depends a frame composed of the two vertical posts 17, a horizontal section 18 and two diagonally arranged braces 19. The forward portion of truck 1 is located between the vertical posts 17 which serve to hold the truck from lateral movement, or in other words, it is held in the lengthwise direction of the platform. To the underface of the forward end of the platform are two springs 20, and to the springs is secured an axle 21. To opposite ends of this axle 21 are pivotally mounted the wheel supports 22 and 23, in a manner to permit them to turn on a vertical pivot 24. To the support 22 is connected a bell-crank composed of the arms 25 and 26, and to the support 23 is connected a bell-crank composed of the arms 27 and 28. A rod 29 connects the arms 11 and 25, and a rod 30 connects the arms 13 and 27. Brace rods 31 connect the axles 5 and 21.

To the underface of the platform is supported a toothed rack 32 by the boxes 33 in a manner to permit the rack to have a bodily sliding movement in the direction of its length.

To the platform is pivotally supported a steering lever 34, its lower end having a toothed segment 35 connected to it, and which meshes with the toothed rack 32. This steering wheel imparts a reciprocating movement to the toothed rack. In bearings 36 connected to the underside of the platform is supported a rock-shaft 37, and to this rock-shaft is fixedly connected an arm 38 which has a connection with the toothed rack 37. To the rock-shaft is connected an arm 39, to the free end of which are connected two rods 40 and 41, the rod 40 has a connection with the arm 26, the bell-crank lever connected to the wheel support 22 and the rod 41 has a connection with the arm 28 of the bell-crank-lever connected to the wheel support 23. Wheels 42 are connected to the supports 22 and 23.

By means of the steering lever, the wheel supports 22 and 23 are turned on their pivotal connection with the axle 21. This turning movement of these wheel supports will turn the wheel supports 7 and 8 through the rods 29 and 30, so that all four front wheels will be turned at the same time to either the right or left.

At Fig. 5 is shown a diagram illustrating the manner in which the length of the arms 11 and 25 of the wheel supports 7 and 22 on one side of the vehicle may be ascertained. A line 43 is continued indefinitely through the rear axle 3. The forward wheel 42 is turned at any given angle and a line 44 is extended at right angles to the face of the wheel until it intercepts the line 43, which will be at the point 45. A line 46 is then drawn from the pivot point of the wheel support 7 to the point 45, and the wheel 10 is then located at right angles to the line 46. A given length being allowed the arm 25 of the front wheel support 22, and the rod 29 being of a length substantially equal to the distance between the pivotal points of the wheel supports 7 and 22, the end of the rod 29 is connected to the arm 11 at a distance from the pivot point 9 so that the movement of that end of the rod will be equal to the movement of the forward end of the rod. With the rod thus connected any movement imparted by the steering apparatus to the forward wheels will impart a relative less movement to the center wheels as shown by the diagram.

The connection of the four front wheels will permit all the wheels to turn without skidding.

By connecting the four rear wheels to a truck, and the truck having a connection with the vehicle platform about midway of its length, any rising or falling movement of the four rear wheels will impart about one-half of such movement to the vehicle platform.

By pivoting the axle 5 to the front end of the truck, the axle can oscillate so that the wheels supporting it can have an independent vertical movement to conform to the inequalities of the ground.

I claim as my invention:

1. In a motor vehicle the combination of the platform thereof, a truck supporting one end of the platform and connected thereto about midway of its length, supporting wheels connected to one end of the truck, an axle pivotally connected to the other end of the truck on a horizontal pivot, and supporting wheels connected to the pivoted axle.

2. In a motor vehicle, the combination of the platform thereof, a truck supporting one end of the platform and connected thereto about midway of its length, means holding the truck against lateral movement, supporting wheels connected to one end of the truck, an axle pivotally connected to the other end of the truck on a horizontal pivot, and supporting wheels connected to the pivoted axle.

3. In a motor vehicle, the combination of the platform thereof, a truck supporting the rear end of the platform and connected thereto about midway of its length, supporting wheels connected to the rear end of the truck, an axle pivotally connected to the forward end of the truck on a horizontal pivot, wheel supports pivotally connected to the ends of the pivoted axle, wheels connected to the supports, a front axle connected to the platform, wheel supports pivotally connected to the ends of the axle, wheels connected to the supports of the front axle, and two rods, each connecting the wheel supports on one side of the vehicle.

4. In a motor vehicle, the combination of the platform thereof, a truck supporting the rear end of the platform and connected thereto about midway of its length, supporting wheels connected to the rear end of the truck, an axle pivotally connected to the forward end of the truck, on a horizontal pivot, wheel supports pivotally connected to the ends of the pivoted axle, wheels connected to the supports, a front axle connected to the platform, wheel supports pivotally connected to the ends of the axle, wheels connected to the supports of the front axle, two rods each connecting the wheel supports on one side of the vehicle, and a steering apparatus for the pivoted wheel supports.

5. In a motor vehicle the combination of the platform thereof, a truck supporting one end of the platform, means connecting the truck and platform about mid-way of the length of the truck, wheels supporting both ends of the truck and means independent of the means connecting the platform and truck for holding the truck against lateral movement, but permitting it to have a vertical movement.

JAMES C. SIMONSON.

Witnesses:
A. O. BEHEL,
E. BEHEL.